United States Patent
Van Horn et al.

(10) Patent No.: US 7,306,243 B2
(45) Date of Patent: Dec. 11, 2007

(54) MULTIPURPOSE COOLER AND METHOD FOR USE THEREOF

(76) Inventors: Peter Van Horn, 823 Ohio St., Terre Haute, IN (US) 47807; Franklin Ray McCarty, 7619 E. Wabash Ave., Terre Haute, IN (US) 47803

( * ) Notice: Subject to any disclaimer, the term of this patent is extended or adjusted under 35 U.S.C. 154(b) by 616 days.

(21) Appl. No.: 10/827,511

(22) Filed: Apr. 19, 2004

(65) Prior Publication Data
US 2005/0230936 A1    Oct. 20, 2005

(51) Int. Cl.
*B62B 1/10*    (2006.01)
(52) U.S. Cl. ............... 280/30; 280/47.26; 280/47.35
(58) Field of Classification Search ........... 280/47.35, 280/35, 639, 652, 47.18, 641, 30, 655, 47.17, 280/47.19, 47.26, 47.315; 62/457.1, 547.7, 62/457.9, 337; 16/110.5, 115; 220/902
See application file for complete search history.

(56) References Cited

U.S. PATENT DOCUMENTS

| | | | |
|---|---|---|---|
| 1,042,249 A * | 10/1912 | Mickelson | ............. 62/457.7 |
| 4,515,421 A | 5/1985 | Steffes | |
| 5,156,291 A | 10/1992 | Mielke | |
| 5,285,656 A | 2/1994 | Peters | |
| 5,373,708 A | 12/1994 | Dumoulin | |
| 5,407,218 A * | 4/1995 | Jackson | ............. 280/30 |
| 5,480,170 A * | 1/1996 | Kaiser, II | ............. 280/30 |
| 5,598,943 A | 2/1997 | Markus | |
| 5,605,056 A * | 2/1997 | Brown et al. | ............. 62/457.4 |
| 5,839,738 A * | 11/1998 | Ozark | ............. 280/30 |
| 6,176,499 B1 | 1/2001 | Conrado et al. | |
| 6,311,991 B1 | 11/2001 | Conrado et al. | |
| 6,315,149 B1 * | 11/2001 | Conrado et al. | ............. 220/521 |
| 6,328,179 B1 * | 12/2001 | Conrado et al. | ............. 220/592.2 |
| 6,364,329 B1 * | 4/2002 | Holub et al. | ............. 280/47.26 |
| 6,446,988 B1 | 9/2002 | Kho | |
| 6,467,779 B1 * | 10/2002 | Mills | ............. 280/47.26 |
| 6,474,097 B2 * | 11/2002 | Treppedi et al. | ............. 62/457.7 |
| 6,536,796 B1 * | 3/2003 | Solomon | ............. 280/651 |
| 2005/0230936 A1 * | 10/2005 | Van Horn et al. | ............. 280/641 |
| 2006/0237928 A1 * | 10/2006 | Vanderberg et al. | ............. 280/35 |

* cited by examiner

*Primary Examiner*—J. A. Shriver
(74) *Attorney, Agent, or Firm*—Lafkas Patent LLC; David M. Lafkas

(57) ABSTRACT

A multipurpose cooler for storing and transporting items includes a cooler body having an insulated interior and an exterior; a lid connected to the cooler body to permit selective access to the interior; a basket having three walls and a bottom and being slidably connected to the cooler body to slide between a fully extended position forming, with the cooler body, a basket cavity for storing and transporting items and a fully retracted position wherein the basket cavity is substantially nonexistent.

36 Claims, 15 Drawing Sheets

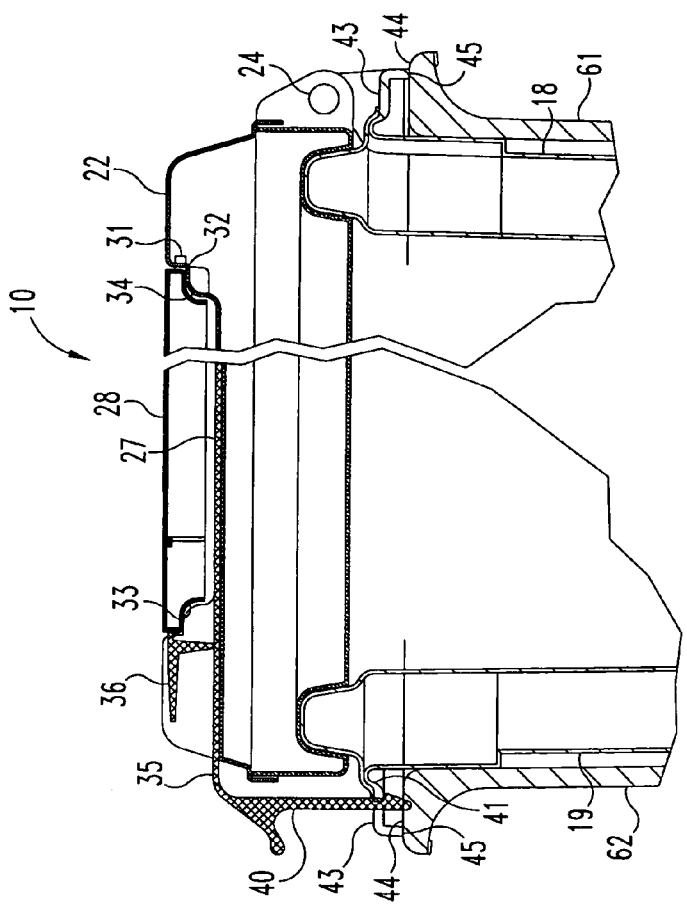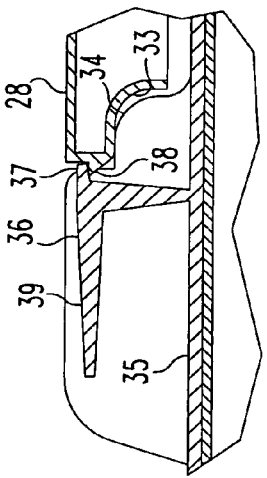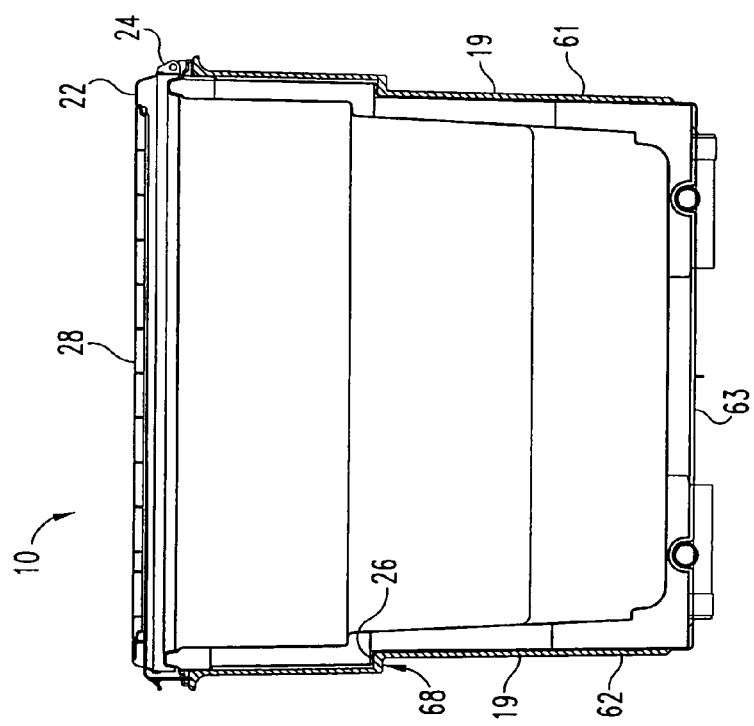
Fig. 5
Fig. 6
Fig. 4

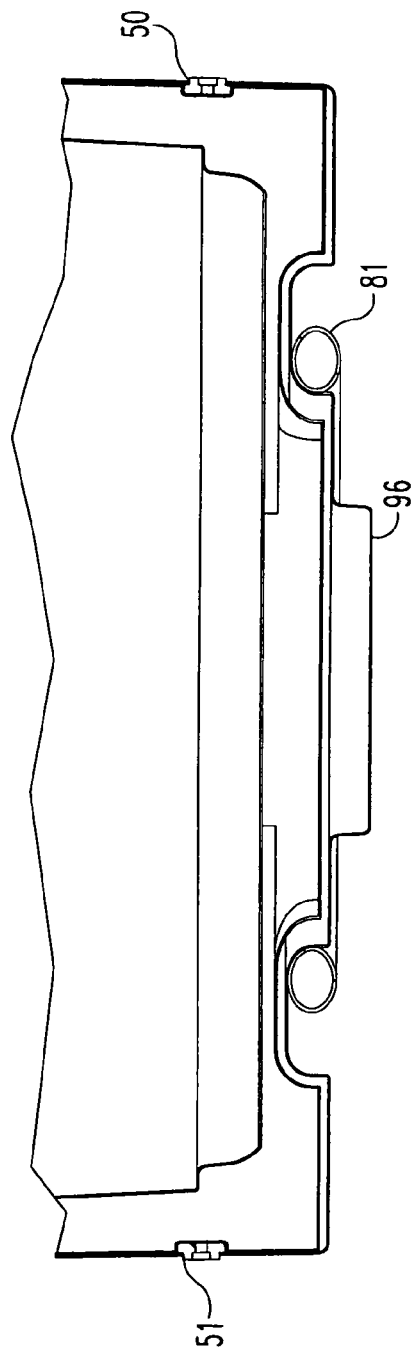
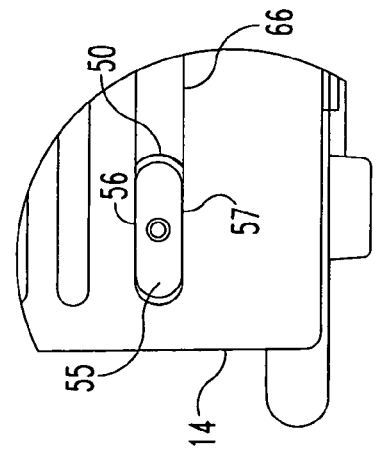
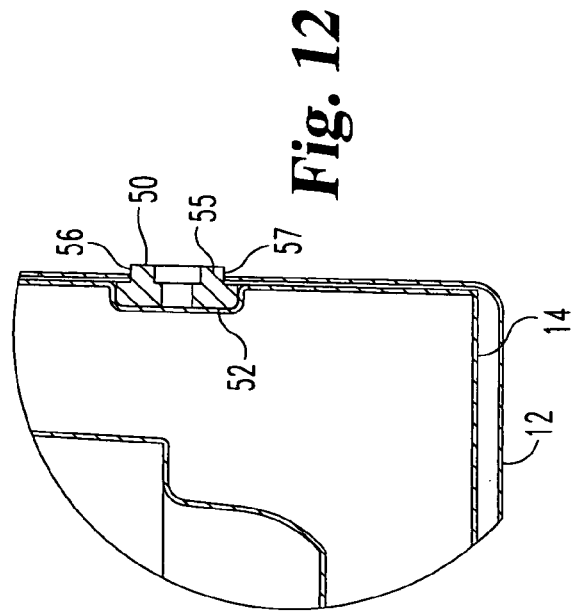
Fig. 11
Fig. 12
Fig. 13

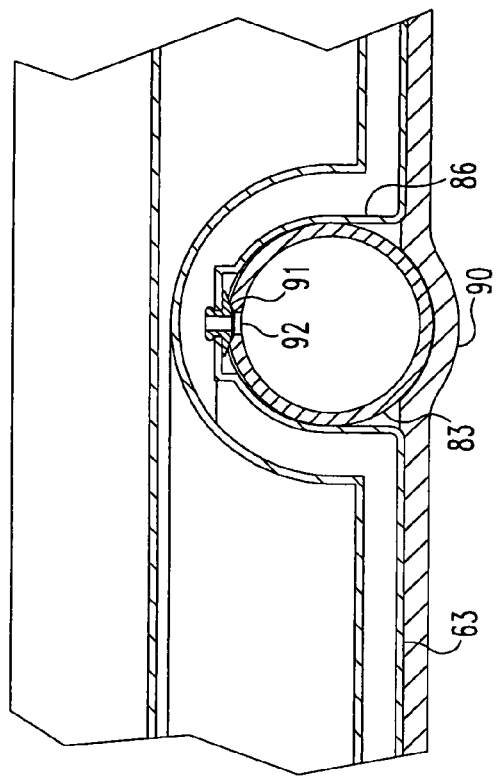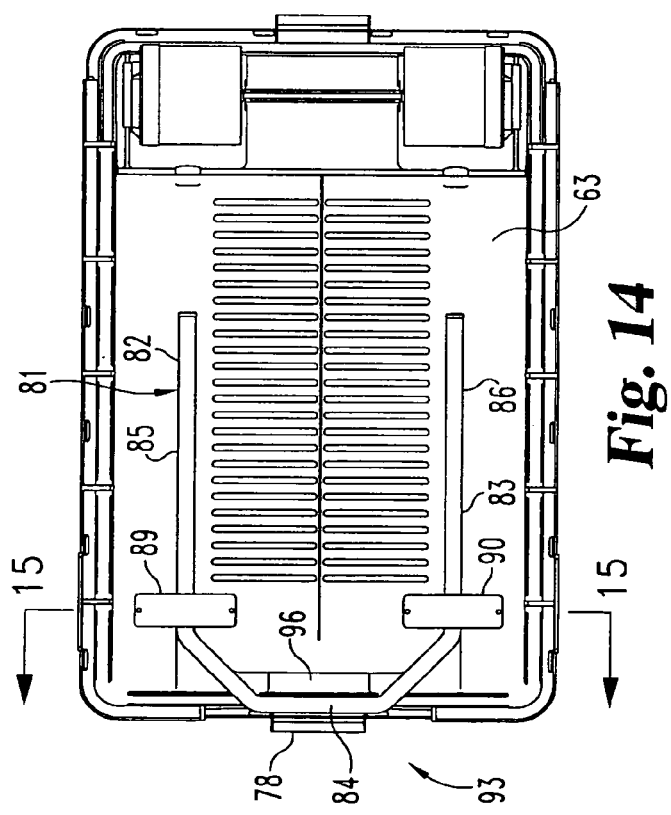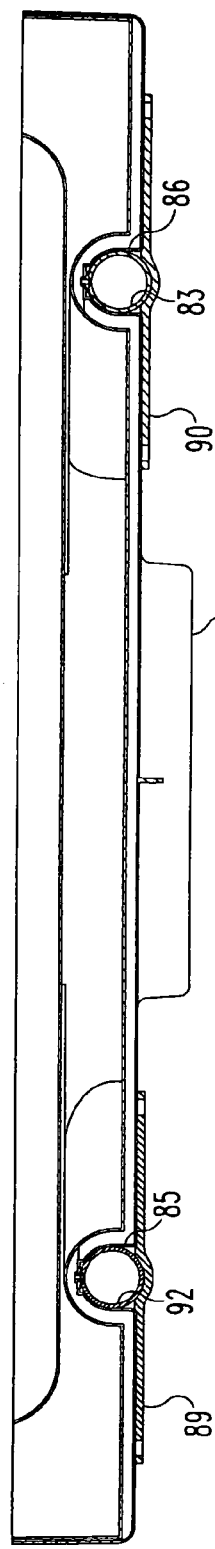

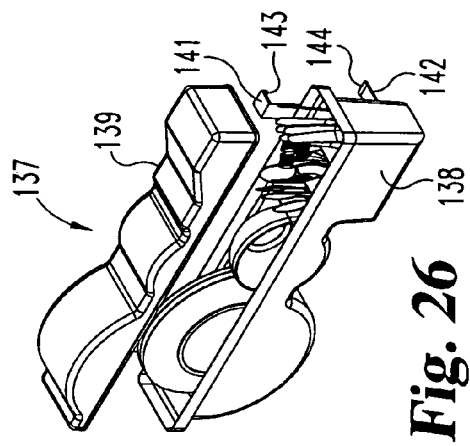
Fig. 26
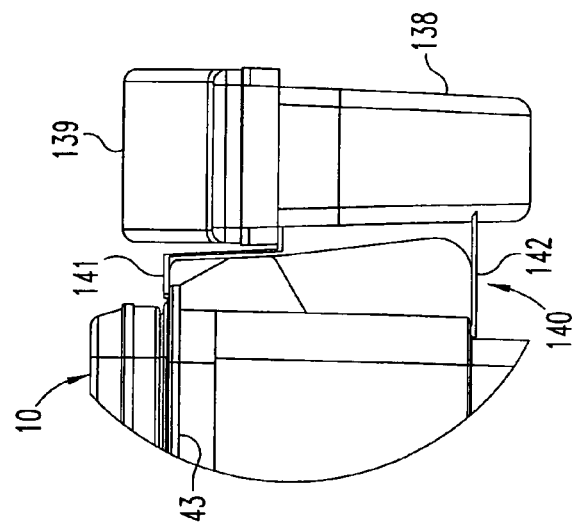
Fig. 25
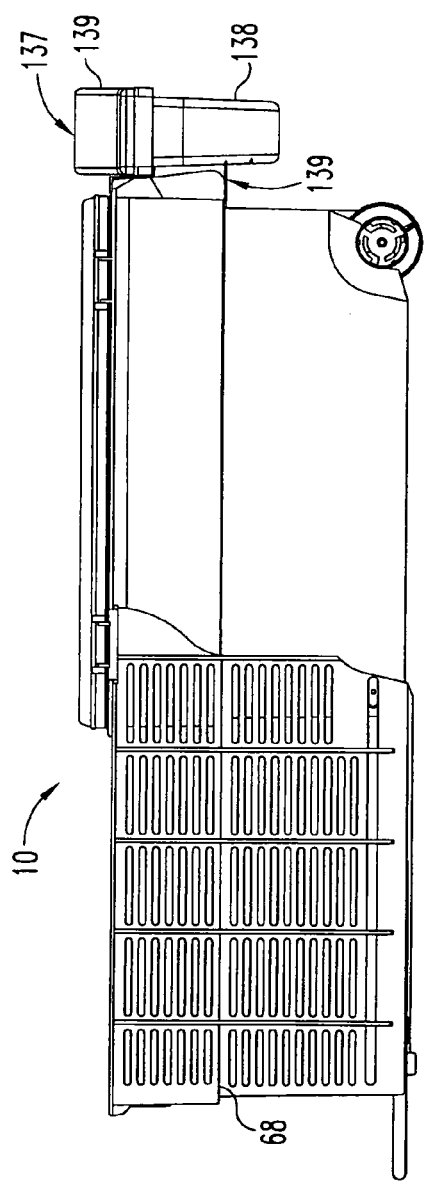
Fig. 22
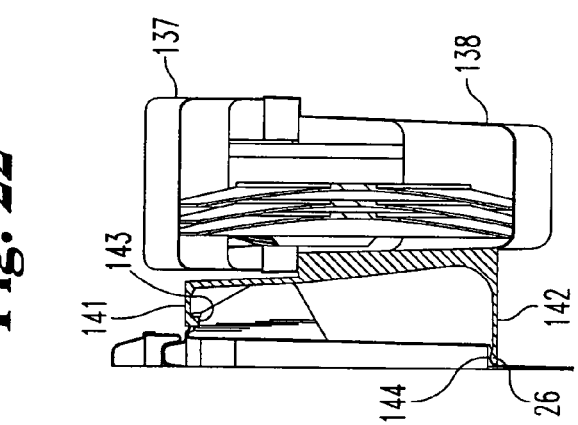
Fig. 24
Fig. 23

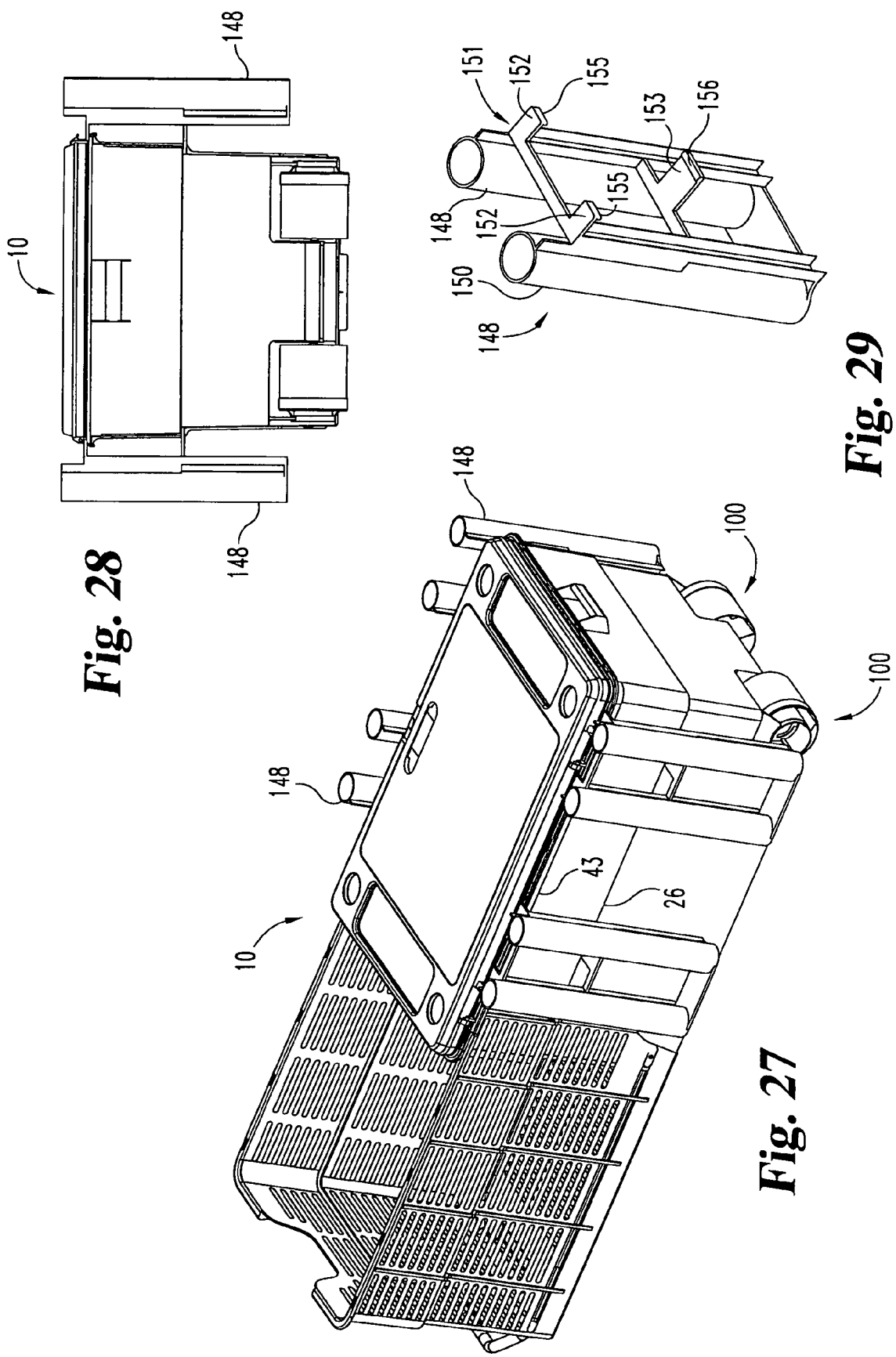

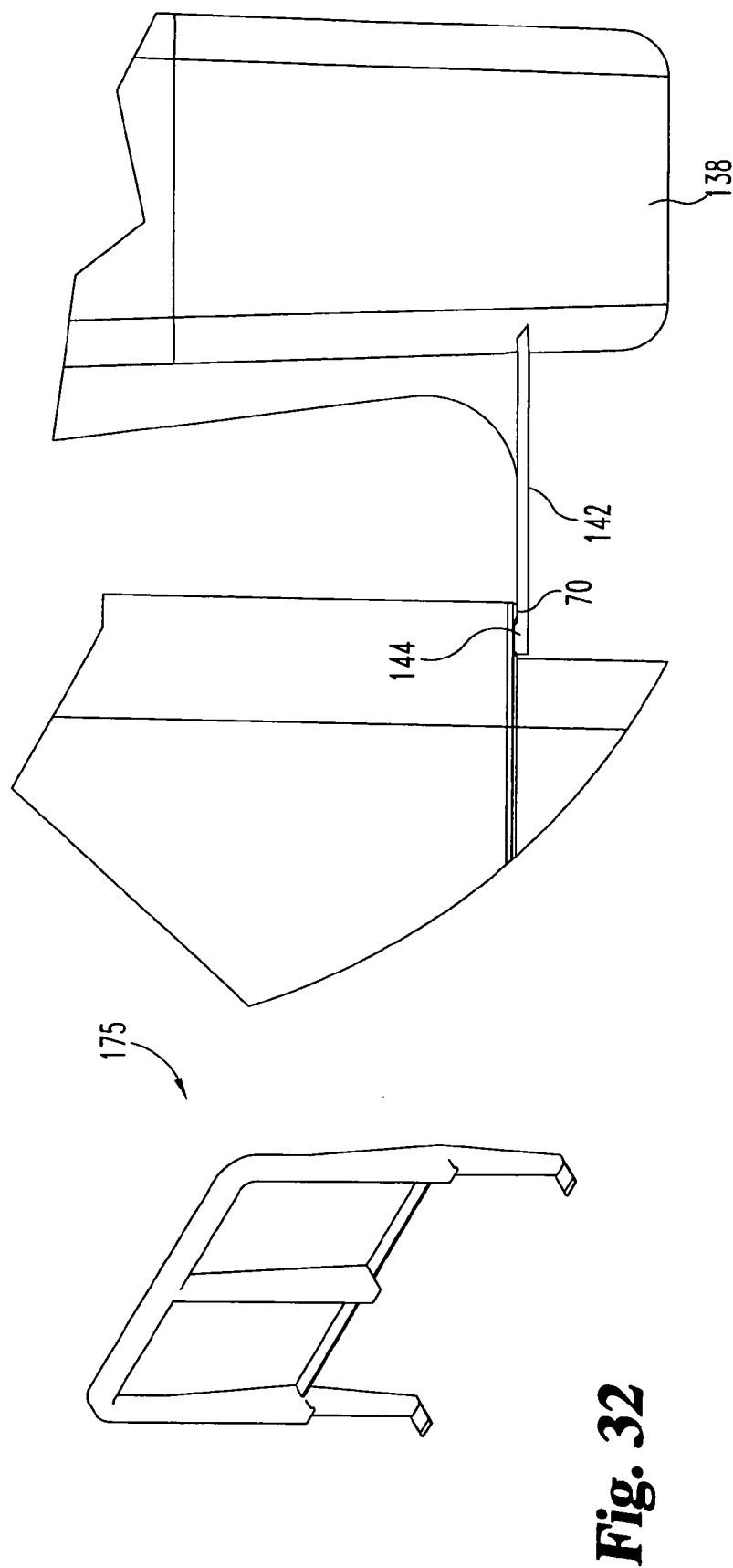

MULTIPURPOSE COOLER AND METHOD FOR USE THEREOF

FIELD OF THE INVENTION

The present invention relates to the field of coolers, and more specifically, to a multipurpose cooler configured for storing and transporting a variety of items both inside and outside the cooler.

BACKGROUND OF THE INVENTION

Traveling away from one's own refrigerator often necessitates the use of some sort of refrigeration device, such as an insulated cooler. One form of such cooler includes an insulated rectangular box with a lid hingedly connected along one edge. A pair of wheels at one lower edge and one or more handles are sometimes provided to facilitate pulling or carrying the cooler, which may be stuffed full of food, beverages and ice. The addition of external carrying devices such as cargo nets and bungee cords has been suggested (e.g. U.S. Pat. Nos. 6,474,097 and 5,407,218) to permit the user to carry additional items externally while pulling the cooler. Improvements are continually being sought.

SUMMARY OF THE INVENTION

Generally speaking, a multipurpose cooler and method are provided for storing a plurality of items. In one embodiment, a multipurpose cooler for storing and transporting items includes a cooler body having an insulated interior and an exterior; a lid connected to the cooler body to permit selective access to the interior; a basket having three walls and a bottom and being slidably connected to the cooler body to slide between a fully extended position defining a basket cavity for storing and transporting items and a fully retracted position collapsing the basket cavity.

It is an object of the present invention to provide an improved multipurpose cooler for storing and transporting items.

Other objects and advantages of the present invention will become apparent from the following description of the preferred embodiment.

BRIEF DESCRIPTION OF THE DRAWINGS

FIG. 4 is a cross-sectional view of the multipurpose cooler 10 of FIG. 1 taken along the lines 4-4 and viewed in the direction of the arrows.

FIG. 5 is an enlarged, fragmented view of the multipurpose cooler 10 of FIG. 4.

FIG. 6 is an enlarged view of a portion of the multipurpose cooler 10 of FIG. 5 showing latch 36.

FIG. 7 is an enlarged view of a portion of the container 10 of FIG. 2 showing hinge 23 and spring clip 49.

FIG. 11 is cross-sectional view of the bottom portion of multipurpose cooler 10 of FIG. 1 taken along the lines 11-11 and viewed in the direction of the arrows.

FIG. 12 is an enlarged view of a portion of the multipurpose cooler 10 of FIG. 11 and showing track guide 50.

FIG. 13 is an enlarged view of a portion of the multipurpose cooler 10 of FIG. 9 and showing track guide 50.

FIG. 14 is a bottom view of the multipurpose cooler 10 of FIG. 1.

FIG. 15 is an enlarged cross-sectional view of the bottom portion of multipurpose cooler 10 of FIG. 14 taken along the lines 15-15 and viewed in the direction of the arrows.

FIG. 16 is an enlarged view of a portion of the multipurpose cooler 10 of FIG. 15 showing handle arm 83.

FIG. 17 is an enlarged view of a portion of the basket 12 of FIG. 2 identified in window F17 and showing notch 79.

FIG. 22 is a side view of the cooler 10 of FIG. 1 and showing the addition of a utensil holder 137 in accordance with the present invention.

FIG. 23 is a perspective view of the multipurpose cooler 10 of FIG. 22 showing a utensil holder 137.

FIG. 24 is a side cross-sectional view of the utensil holder 137 connected with multipurpose cooler 10 of FIG. 23.

FIG. 25 is an enlarged side view of the utensil holder 137 and multipurpose cooler 10 of FIG. 22.

FIG. 26 is an exploded, perspective of the utensil holder 137 of FIG. 22.

FIG. 27 is a perspective view of the multipurpose cooler 10 of FIG. 1 and showing the addition of rod holders 148 in accordance with the present invention.

FIG. 28 is an end view of the multipurpose cooler 10 and rod holders 148 of FIG. 27.

FIG. 29 is a perspective view of a rod holder 148 of FIG. 27.

FIG. 32 is perspective view of an alternative backrest 175 in accordance with the present invention.

FIG. 33 is an enlarged view of a portion of the cooler 10 and utensil holder 137 of FIG. 25 and showing ridge 70.

DESCRIPTION OF THE PREFERRED EMBODIMENT

Figure 1:
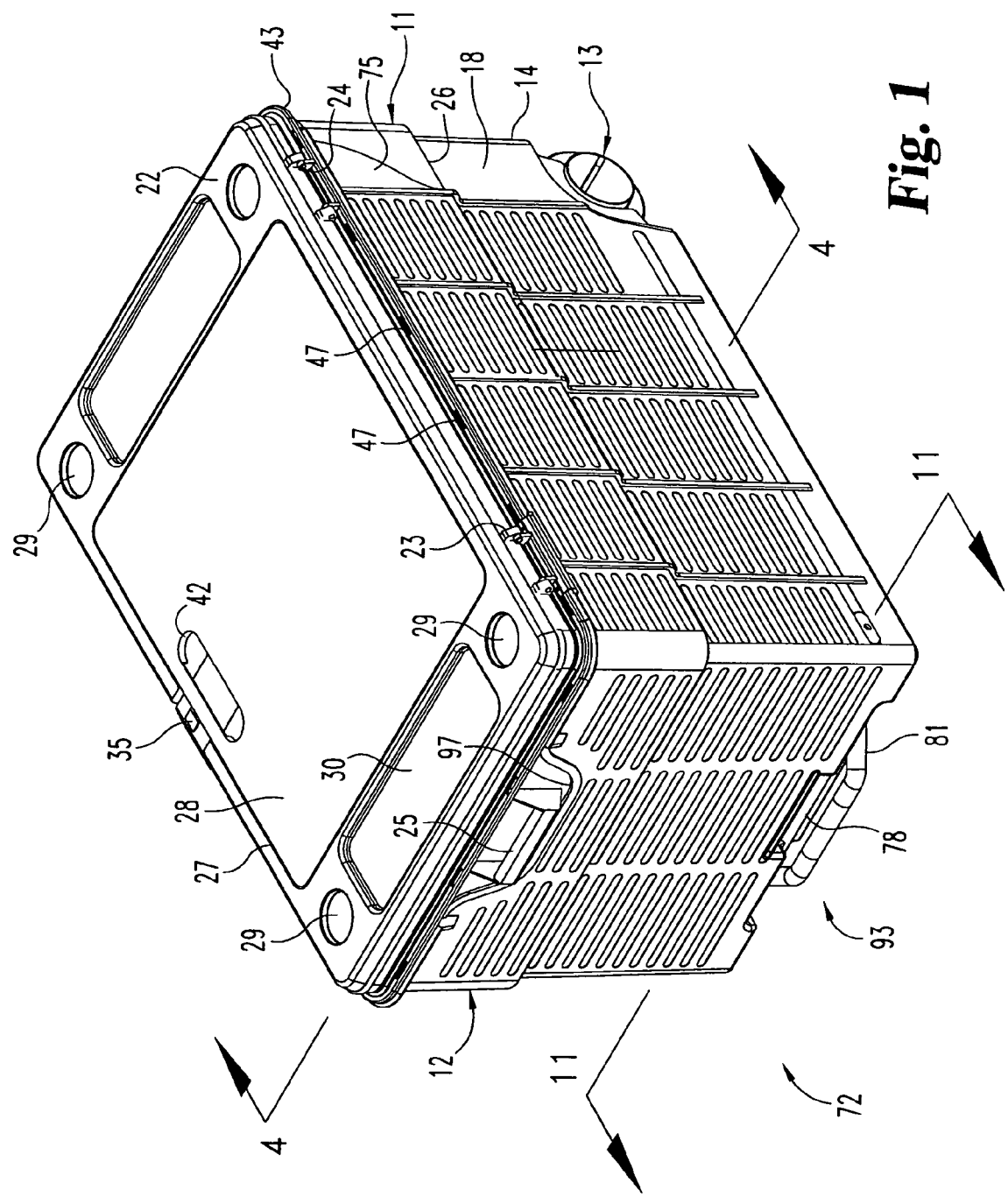
FIG. 1 is a perspective view of a multipurpose cooler 10 for storing and transporting items and including a cooler 11, and with basket 12 shown in the fully retracted position 72.

For the purposes of promoting an understanding of the principles of the invention, reference will now be made to the embodiments illustrated in the drawings and specific language will be used to describe the same. It will nevertheless be understood that no limitation of the scope of the invention is thereby intended, and any alterations or modifications in the illustrated device, and any further applications of the principles of the invention as illustrated therein are contemplated as would normally occur to one skilled in the art to which the invention relates.

Figure 8:
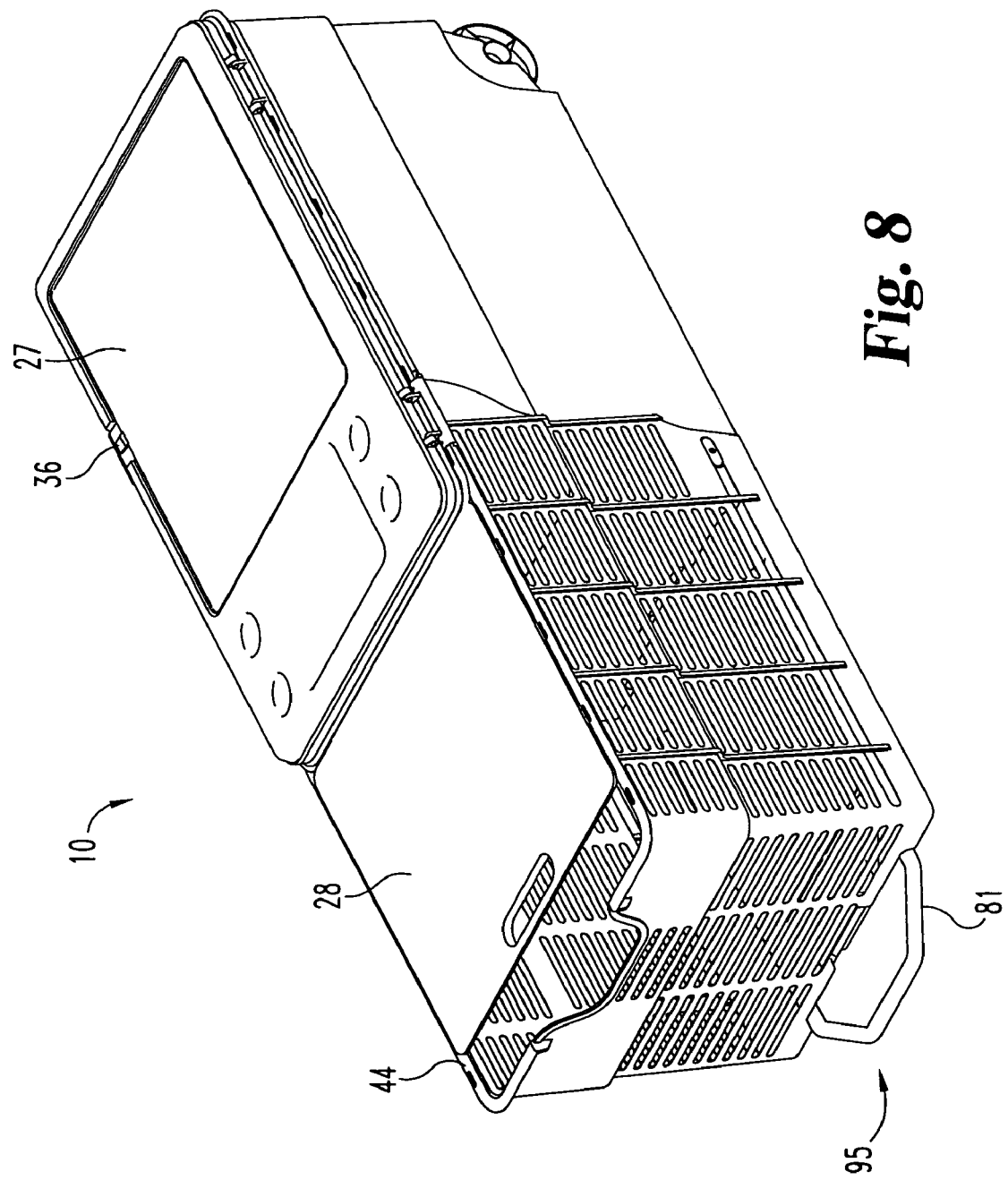
FIG. 8 is a perspective view of the multipurpose cooler 10 of FIG. 2 and showing cutting board 28 positioned atop basket 12.
Figure 10:
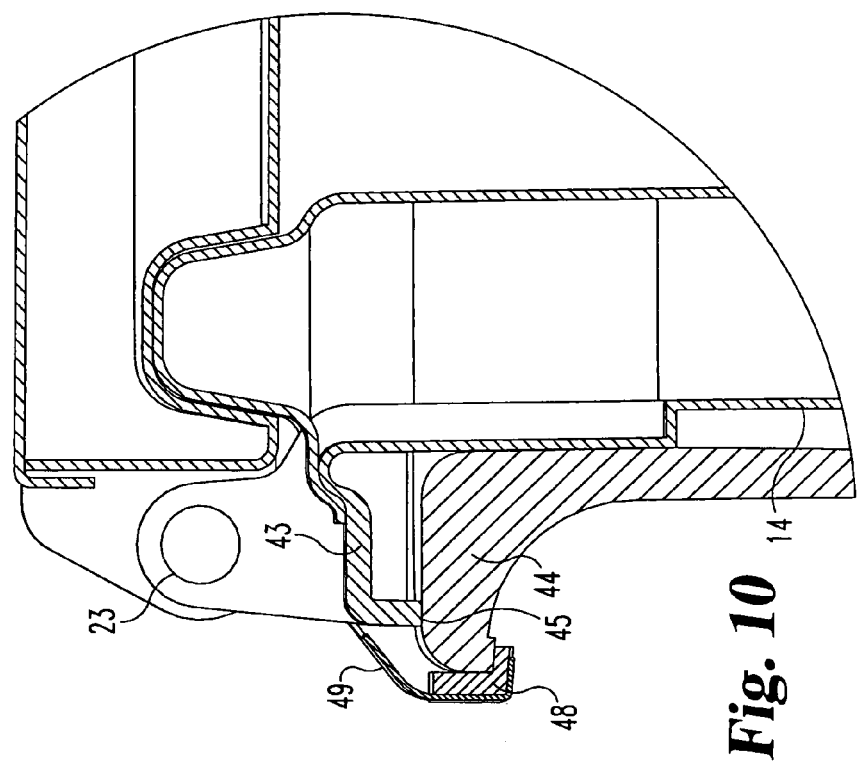
FIG. 10 is an enlarged, side and cross-sectional view of a portion of the multipurpose cooler 10 of FIG. 9 taken along the lines 10-10 and viewed in the direction of the arrows.

Referring now to FIGS. 1-8, there is shown a multipurpose cooler 10 for storing and transporting items both internally and externally of such cooler in accordance with one embodiment of the present invention. At its minimum, multipurpose cooler 10 generally includes a cooler 11, a basket 12 and preferably wheels 13. Cooler 11 is intended to be similar to known coolers in that it is made of a lightweight plastic material and with suitable insulation material to provide temperature insulation to contents placed therein. That is, cooler 11 is constructed to exhibit a low rate of heat transfer through its walls and lid. Cooler 11 has a cooler body 14 that includes front wall 17, opposing side walls 18 and 19, rear wall 20, bottom wall 21 and a lid 22 that is hingedly connected to and along the top edge of one of the side walls 18 by hinges 23 and 24. Alternative embodiments are contemplated wherein a lid is connected to the cooler body 14 by means other than hinges including buy not limited to a sliding interconnection or a pivoting interconnection. Handles 25 extend outwardly at the top of front and rear walls 17 and 20. The width and length of cooler body 14 at its lower portion is less than at its upper portion to define a downwardly facing ledge 26 that runs all the way around cooler body 14. (Ledge 26 need not run completely around cooler body 14, but its presence enables removable connection of a variety of accessories (or accessory holding devices) to cooler body 14, as described herein, and extension of ledge 26 completely around cooler body 14 maximizes the places where such accessories may be positioned. This includes the front side (64, FIG. 2) of cooler body 14 as cooler body 14 may be used with basket 12 removed, and accessories could be attached to the front of cooler body 14). Lid 22 defines a number of recesses in its top surface: a main recess 27 for holding a shaped cutting board 28, a number of round recesses 29 for receiving glasses, cans and the like, and other variously shaped recesses 30 for miscellaneous items. Recess 27 and cutting board 28 are complimentarily shaped to permit cutting board 28 to firmly fit within and be snappingly held in place in recess 27. Cutting board 28 is recessed on its underside to form a downwardly facing arcuate ledge 33 along the entire outer periphery. Ledge 33 mates with complementary shaped hump 34 that runs around the entire periphery of main recess 27 to ensure that cutting board 28 properly seats in main recess 27. Cutting board 28 and its ledge 33 are sized and shaped so that cutting board 28 can be removed from recess 27 and seated on top of basket 18, as shown in FIG. 8. That is, either the length or width of cutting board 28 are sized so that cutting board 28 can be set atop basket 18, which is in either the fully extended position or in one of its partially extended positions, and whereby the top edge (top flange 44) of basket 18 seats within longitudinal ledge 33 of cutting board 28. This configuration provides a stable positioning of cutting board 28 relative to basket 18. Alternative embodiments are contemplated wherein basket 12 include one or more ledges, other than top flange 44, that form a shelf, which is sized and configured to receive and support cutting board 28.

Cutting board 28 has one or more outwardly extending rear locking tabs 31 that first extend into mating hole(s) 32 defined along the rear edge of main recess 27 when cutting board 28 is positioned in recess 27. A molded plastic latch strap 35 connects atop lid 22, as shown. Latch strap 35 includes a resilient, upwardly extending cutting board latch 36 that has a hook 37 that engages with the front edge of, or with a hook 38 at the front edge of cutting board 28 (FIG. 6) to hold cutting board 28 firmly in place. Depressing the handle 39 of latch 36 pivots latch away from cutting board 28 sufficiently to enable cutting board 28 to be pulled out from recess 27. Latch strap 35 extends out through the front edge of lid 22 and downwardly as a lid latch 40 to engage with a lip 41 of cooler body 14 to hold lid 22 closed. Alternative embodiments are contemplated wherein cutting board 28 is removably held within recess 27 by other appropriate means such as, and without limitation, detents or similar structures, magnets or Velcro®. The other recesses 29 and 30 in lid 11 are to provide a degree of lateral stability to items (such a beverage glass) that are placed therein. An opening 42 in cutting board 28 allows the user to access lid latch 36 and to lift cutting board 28 out from its recess 27.

At the top of each wall 17-20, cooler body 14 extends outwardly to form a continuous cooler flange 43, which then angles downwardly to form a downwardly facing ridge 45 against which the outwardly extending, upper flange 44 of basket 18 bears as basket 18 slides forward and back relative to cooler body 14. Both top flange 44 of basket 18 and cooler flange 43 of cooler body 14 define a plurality of slots 46 and 47, respectively, that are spaced around the periphery of the respective flanges 44 and 43. Slots 46 and 47 may be evenly spaced or grouped as desired to achieve a certain accessory mounting configuration, as described herein. Alternative embodiments are contemplated wherein slots 46 and/or 47 have other shapes such as and without limitation, circular, square, rectangular, L-shaped, crescent-shaped or any other desired configuration. Use of the term "slot" herein is intended to include any other such configuration. The hooks (143) described herein for engagement with such slots 46 and 47 are intended to have any configuration necessary to provide a sufficiently reliable connection between the accessory and cooler body 14. Alternative embodiments are contemplated wherein connections other than slot and hook are employed between the accessory and the cooler body 14 such as, and without limitation, a Velcro® assembly or a hook and ridge assembly.

Figure 9:
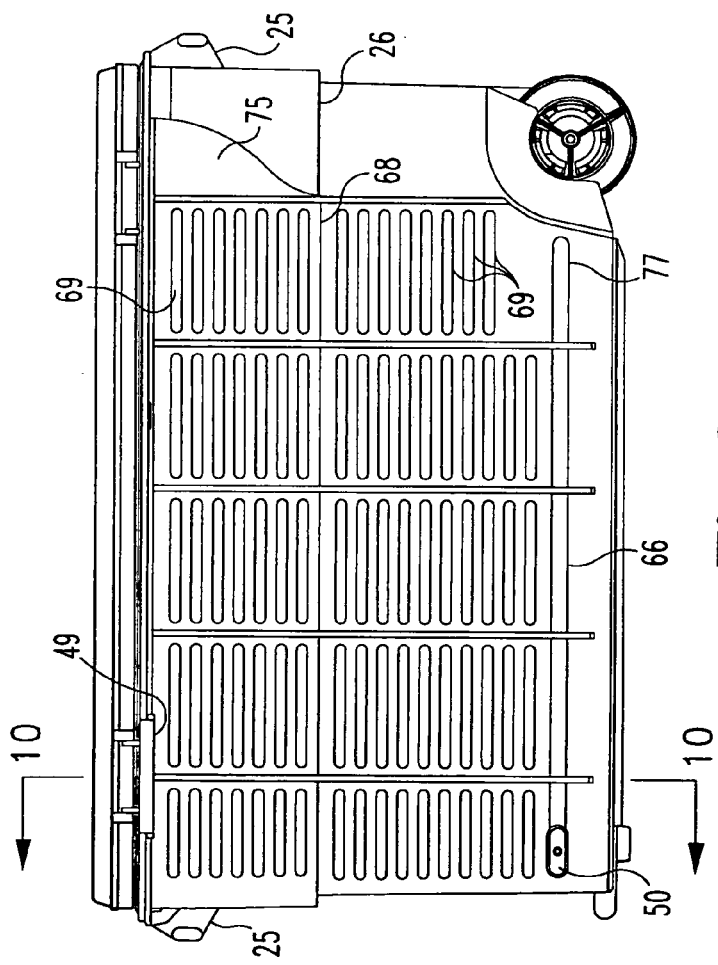
FIG. 9 is a side view of the multipurpose cooler 10 of FIG. 1.

Referring to FIGS. 7-9, a molded plastic or nylon, generally L-shaped slide bushing 48 is held by a metal spring clip 49, which is held by the cooler body near forward hinge 23, as shown. Bushing 48 combines with upper ridge 45 and the side of the cooler body 14 to form a channel through which the basket upper flange 44 is constrained to slide, forward and backward. Referring to FIGS. 9 and 11-13, near the bottom and front of cooler body 14, on opposing sides thereof, cooler body 14 is provided with plastic track guides 50 and 51. Each guide 50 and 51 is seated within a complimentarily shaped hole 52 defined in cooler body 14 and held firmly therein by appropriate means such as a screw, a pressure fit, pop rivet or glue. Either by their mating shapes with their holes 52 or by their means of attachment, guides 50 and 51 are constrained against movement of any kind. Each guide 50 and 51 includes a post 55 that extends outwardly from cooler body 14, the post being oblong-shaped with opposing slide edges 56 and 57 that are mutually straight and parallel. In an alternative embodiment, track guides 50 and 51 are homogeneously and integrally molded with cooler body 14

Figure 2:
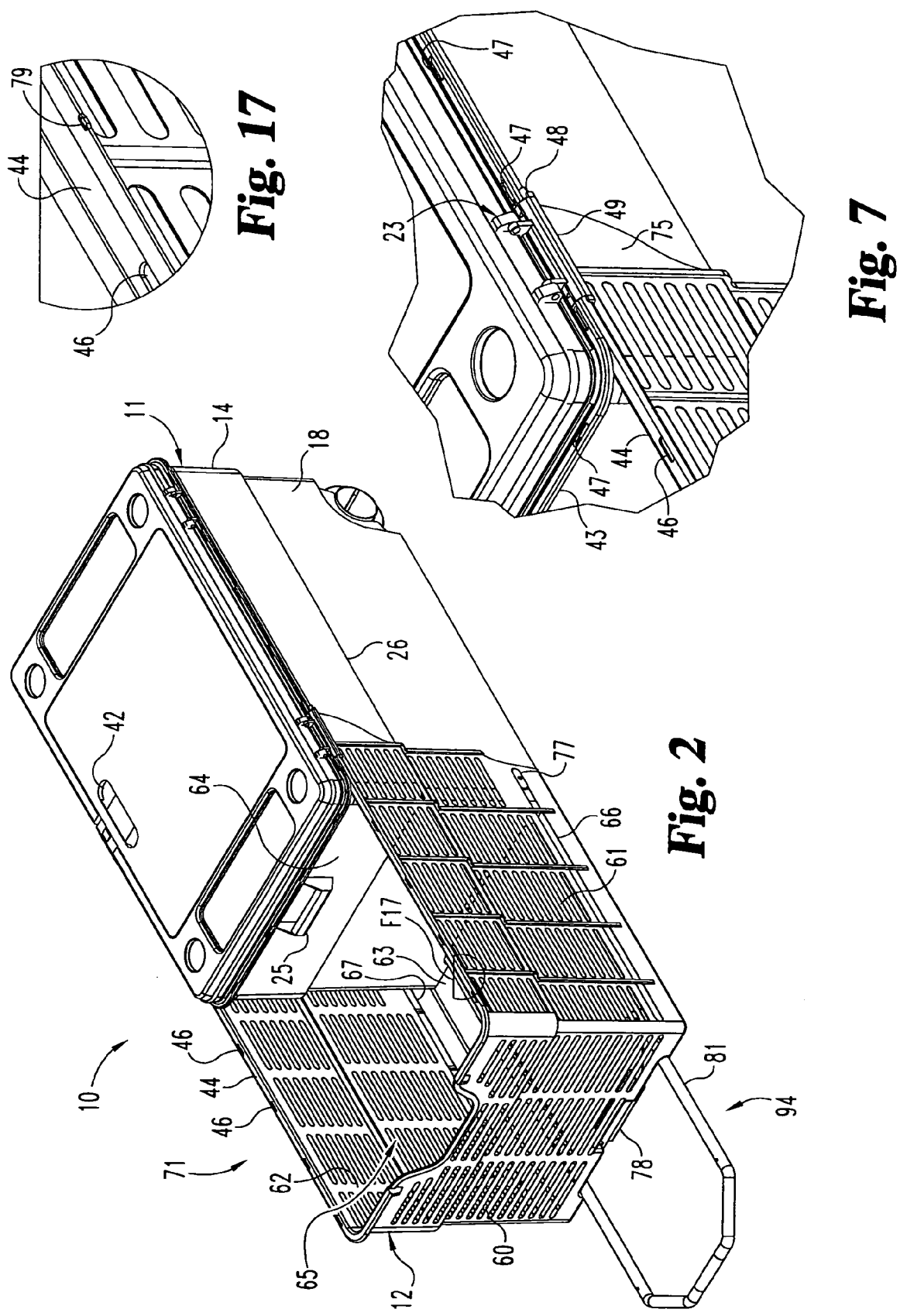
FIG. 2 is a perspective view of the multipurpose cooler 10 of FIG. 1 and showing basket 12 in the fully extended position 71.
Figure 3:
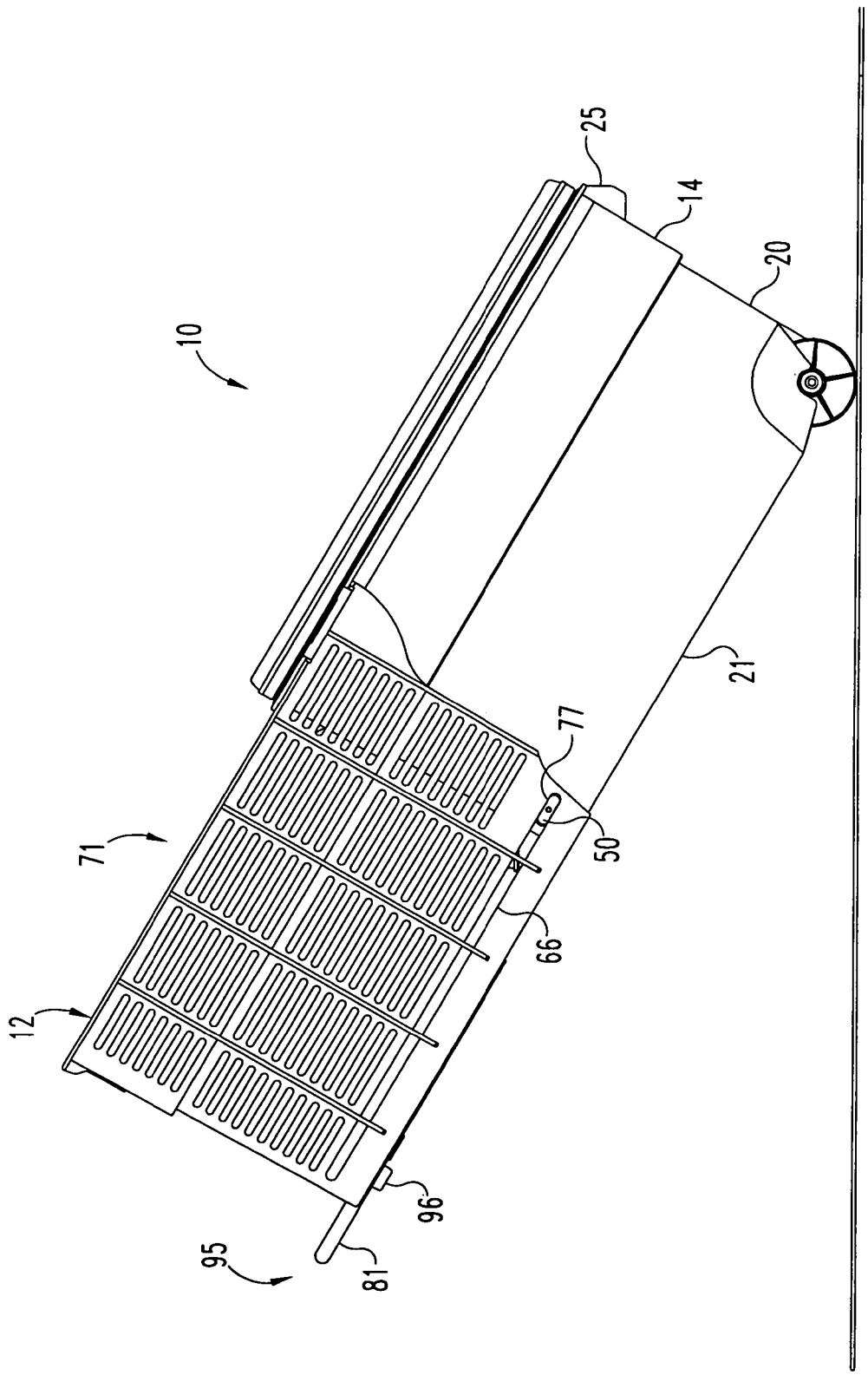
FIG. 3 is a side view of the multipurpose cooler 10 of FIG. 2 and shown in the transport position.

Referring to FIGS. 1-15, and more to FIGS. 2, 4, 8 and 14, basket 12 is plastic and has a front wall 60, opposing side walls 61 and 62 and a bottom wall 63. When in the open, extended position 71 (FIG. 2), basket walls 62, bottom 63 and front wall 64 of cooler body 14 define a basket cavity 65 suitable for storing and transport items. At their bottoms, side walls 61 and 62 define elongate and closed-ended slots 66 and 67, respectively, which are sized to slidably receive the oblong posts 55 of track guides 50 and 51, respectively. The fit between slots 66 and 67 and posts 55 is loose enough to permit easy sliding motion between basket 12 and cooler body 14, but tight enough so that, in combination with the length of straight slide edges 56 and 57 of posts 55, there is a level of stability (against rotation about posts 50) between basket 12 and cooler body 14, especially when basket 12 is in its fully extended position 71 (FIGS. 2 and 3). As the length of slide edges 56 and 57 increases, so does the stability of basket 12 relative to cooler body 14.

The size and shape of basket 12 is just larger than the outer size and shape of cooler body 14 so that basket 12 can be telescopically received and slide between a fully retracted position 72 (FIG. 1) and fully extended position 71 (FIG. 2). Basket 12 is constrained to slide between these two positions by engagement of posts 55 of track guides 50 and 51 riding within slots 66 and 67, and by top flange 44 of basket 12 positioned in sliding engagement subjacent to upper ridge 45 of cooler body 14. The length of slide of basket 12 between the fully retracted position 72 and fully extended position 71 is defined by the length of slots 66 and 67. Like cooler body 14, the front and side walls 60-62 of basket 12 define a downwardly facing ledge 68. Both ledge 26 of cooler body 14 and ledge 68 are generally at a right angle to the sides of cooler body 14, and, perhaps even with a slight negative slope or elongate bead or ridge 70 running the length of ledge 68 (FIG. 33). Basket 12 is shown with a plurality of vents 69, which reduces weight, cost and wind resistance, as well as offering a better view of the contents of the basket. At its rear, the top of each side wall 61 and 62 extends rearwardly as support fins (one shown at 75) a short distance farther than the rearmost end 77 of guide slots 66 and 67. When basket 12 is at its fully extended position 71 with track guides 50 and 51 at the rear most end 77 of slots 66 and 67, fins 75 provide added length to the rear portion of top flange 44 to bear up against upper ridge 45 and support basket 12 in a cantilevered-type connection with cooler 14. Basket 12 is latched in the fully retracted position 72 by a resilient latch 78 (FIG. 1) extending from bottom wall 63 of basket 12. Latch 78 engages with a lip defined at the front of bottom wall 21 of cooler body 14. To open basket 12, latch 78 can easily be depressed to release basket 12 from its fully retracted position 72. To close basket 12, it is slidably pushed all the way to the fully retracted position 72 until latch 78 snaps into engagement. A number of intermediate positions are provided for basket 12 between the fully extended and fully retracted positions 71 and 72, respectively, by a temporary locking mechanism between top flange 44 of basket 12 and upper ridge 45 of cooler body 14. In the present embodiment, such temporary locking mechanism is a passive detent configuration that includes a dent or notch 79 (FIG. 17) defined in top flange 44, proximal the front wall 60 and on at least one side of cooler body 14 and includes at least one protrusion (not shown) extending downwardly from upper ridge 45. As basket 12 is slid between fully retracted and fully extended positions, the one or more protrusions (not shown) serially engage with notch 79 and somewhat fixedly hold basket 12 locked with cooler body 12. This or any suitable configuration between basket 12 and cooler body 14 must not be too strong of a lock to require excessive pulling force on basket 12 to slide it between fully retracted and fully extended positions. Alternative embodiments are contemplated wherein such passive detent configuration, or a any other temporary locking mechanism (i.e. a hinged, spring biased latch mechanism) are strong enough to hold basket 12 and cooler body 14, in a position somewhere between the fully extended and fully retracted positions 71 and 72, as cooler 10 is being pulled, fully or substantially loaded. Also, the fully retracted position includes basket cavity 65 being substantially entirely collapsed against cooler body 14, which minimizes the size of apparatus 10 for storage and transport when there are no items stowed or intended to be stowed in cavity 65. Alternative embodiments are contemplated wherein basket 12 may be fully retracted, but basket cavity 65 may not be fully collapsed. For example, basket 12 may be configured to be fully collapsed (retracted as far as it and cooler body 14 will allow), but there may still be some significant volume in cavity 65 to accommodate one or more items, such as a cooler carrying strap, collapsible bag, etc.

Referring to FIGS. 1 and 14-16, cooler 10 is further provided with an extendable handle 81. Handle 81 is made of any suitable material such as plastic or metal and is generally U-shaped with legs 82 and 83 and hand grip 84 extending therebetween. The bottom wall 63 of basket 12 defines a pair of elongate channels 85 and 86 that are sized and positioned to slidingly receive handle arms 82 and 83. Retention clips 89 and 90 are affixed by appropriate means (such as screws, not shown) to bottom wall 63 to hold arms 82 and 83 in place, but are complimentarily shaped and sized to permit arms 82 and 83 to freely slide between clips 89 and 90, respectively, and bottom wall 63. Retention clips 89 and 90 are made of any suitable material such as plastic or nylon so long as they permit easy sliding action of handle 81. Alternatively, a nylon bushing or similar element may be connected with basket 12 to ensure smooth sliding motion of handle 81. A pop rivet 91 is provided at one or more strategic locations in the top of each channel 85 and 86, and one or more holes 92 are defined in the top of each arm 82 and 83. The holes 92 and pop rivets 91 comprise a detent assembly to provide handle 81 with a number of positions including a full-in, storage position 93. (FIGS. 1 and 14) and a full-out, transport position 94 (FIG. 2) and preferably at least one intermediate position 94 (FIGS. 3 and 8). The intermediate positions expand the range of user comfort while pulling cooler 10. Bottom wall 63 further includes a rest pad 96 on which the front of cooler 10 rests when sitting on the ground. Front wall 60 of basket 12 dips down (at 97) at its upper edge to provide clearance for front handle 25.

Figure 18:
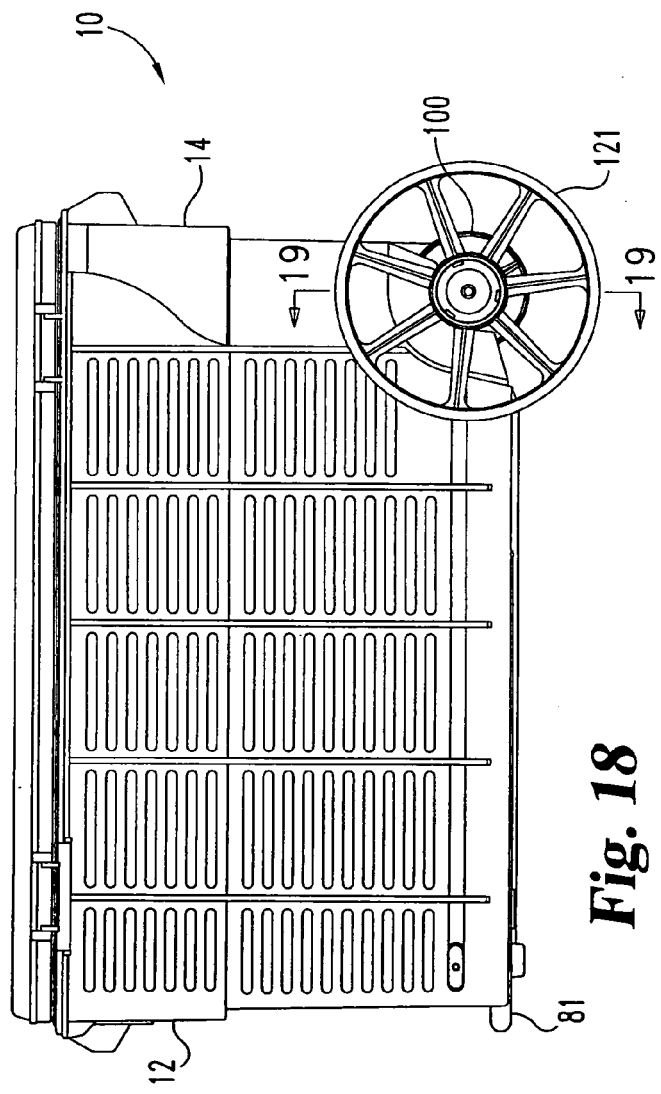
FIG. 18 is a side view of the multipurpose cooler 10 of FIG. 1 and showing the addition of all-terrain wheels (one shown at 121) in accordance with the present invention.
Figure 19:
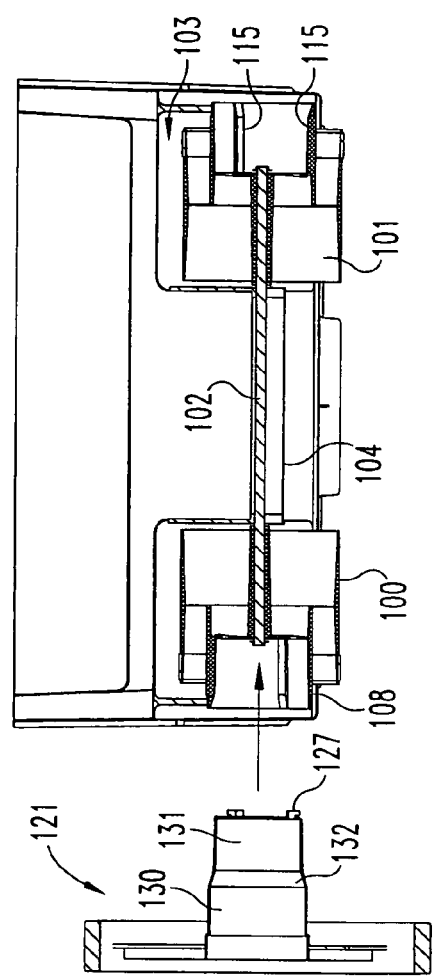
FIG. 19 is a cross-sectional view of the lower portion of multipurpose cooler 10 of FIG. 18 taken along the lines 19-19 and viewed in the direction of the arrows.
Figure 21:
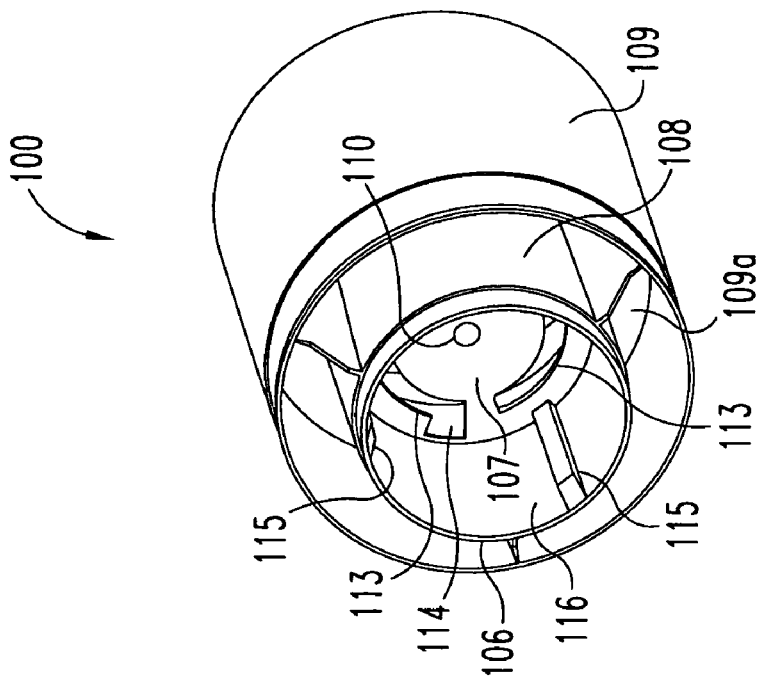
FIG. 21 is a perspective view of a standard wheel 100 of the multipurpose cooler 10 of FIG. 18.
Figure 20:
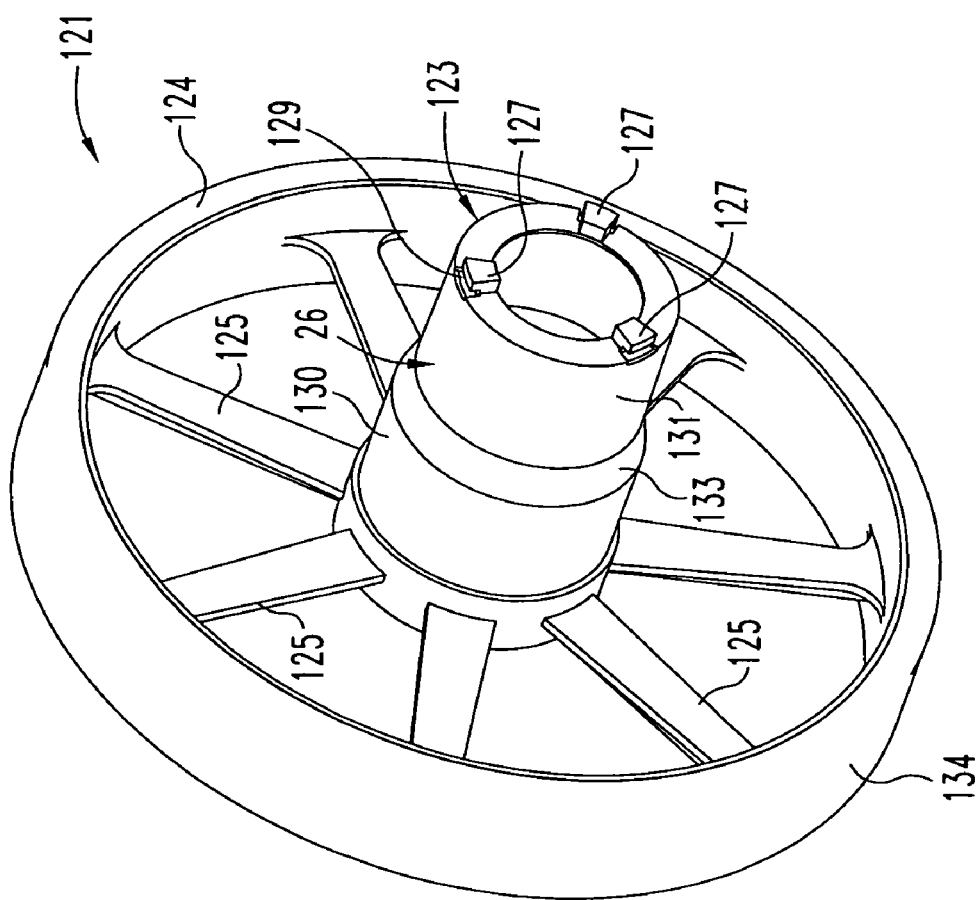
FIG. 20 is an enlarged perspective view of an all-terrain wheel 121 of the multipurpose cooler of FIG. 18.
Figure 30:
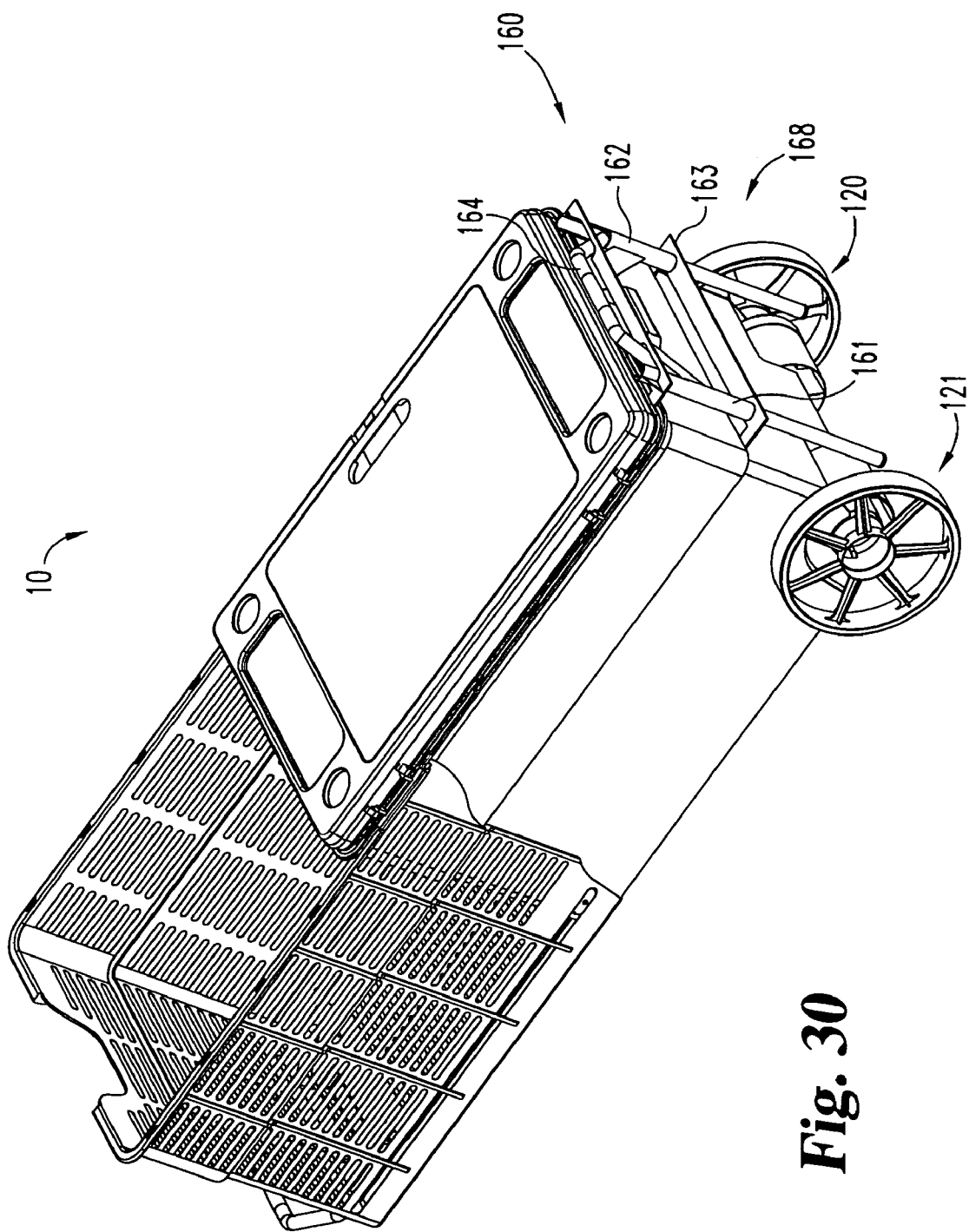
FIG. 30 is a perspective view of the multipurpose cooler 10 of FIG. 1 and showing the addition of backrest 160 in accordance with the present invention, and showing backrest 160 in the retracted position 168.

Referring to FIGS. 1 and 18-21, wheels 13 include a pair of wheels 100 and 101 that are mounted to the rear, underside of cooler body 14 by an axle 102 and largely in a recess 103 shaped to enclose the majority of each wheel. Axle 102 is held by an axle housing 104 that is an extension of the integrally molded cooler body 14. Wheels 100 and 101 are identical and description will be limited to just wheel 100. Wheel 100 includes a central hub 106 that includes a central mounting plate 107 that is surrounded by and connected to a wheel adapter tube 108, which is surrounded by and connected to an outer rim tube 109 by spokes 109a. In one embodiment, wheel 100 is a homogeneous, injection molded plastic unit, but other materials and configurations are contemplated. For example and without limitation, alternative embodiments are contemplated wherein a rubber tread or similar material encircles rim tube 109. Central mounting plate 107 defines a central hole 110 through which axle 102 extends and is capped to retain wheel 100, as is well known in the art. Central mounting hub 107 further defines a set of three arcuate keyholes 113, each defining a larger, keyhole opening 114 at its counterclockwise end. Wheel adapter tube 108 includes three centering ribs (two shown at 115) that are ramped down to the inner surface 116 of wheel adapter tube 108. Wheels 100 and 101 provide adequate rolling action for cooler 10 over normal terrain. For more aggressive terrain, the mutually identical wheels 100 and 101 of cooler 10 further include a pair of mutually identical all-terrain wheels 120 and 121 (FIGS. 18 and 30). The term "all-terrain" is intended to signify that wheels 120 and 121 are sized and configured to facilitate pulling apparatus 10 over fairly rough, uneven and non-solid surfaces, such as a rocky or sandy terrains. Preferably, all-terrain wheels 120 and 121 have diameter that is twice the diameter of standard wheels 100 and 101. Wheel 121 includes a central hub 123 and a large outer rim 124 that is connected to central hub 123 by spokes 125. Central hub 123 includes a central tube member 126, which has a set of three keyhooks 127 that are sized to mate with keyholes 113 of wheel 100. Each keyhook defines a radially, outwardly opening slot 129 that permits keyhooks 127 to pass through keyhole openings 114 and then rotate through and lock with the smaller-dimensioned arcuate slots of keyhole 113. The diameter of tube member 126 proximal the spokes 125 (at 130) has a diameter that is greater than the diameter proximal the keyhooks 127 (at 131) and has a ramping, transitional diameter section in between (at 133). To the outside of outer rim 124 in one embodiment is secured a tire or layer 134 made of rubber or similar substance to soften the ride of cooler 10.

In assembly, all-terrain wheel 121 can be mounted by inserting central hub 123 into wheel adaptor tube 108 and gently twisting wheel 121 until keyhooks 127 register with and pass into their mating keyholes 113. At this point, ramped outer ends of centering ribs 115 have engaged with ramped transition section 133, the sizing and configurations of which produce a snug fit between wheels 100 and 121. Twisting all-terrain wheel 121 clockwise relative to standard wheel 100 drives keyhooks 127 into arcuate keyholes 113 and tightens wheel 121 in place. All-terrain wheels 121 may be removed by performing these steps in reverse.

Cooler 10 is further provided with a variety of accessories including containers and article holding devices. Referring to FIGS. 22-25 there is shown a utensil carrier 137 removably connected with cooler body 14 or a cooler 10 in accordance with the present invention. Utensil carrier 137 and other add-on accessories as are contemplated herein, utilize top flange 44 and its spaced slots 46 along with ledge 26 of cooler body 14. More specifically, utensil carrier 137 includes a container body 138, a mating lid 139 and a mounting bracket 140. Container body 138 provides storage space configured as desired to fit various items, such as dishes and flatware, as shown in FIG. 26. Lid 139 is sized and shaped to cover and preferably snap fit onto body 138 to keep the contents of container body 138 clean and dry. Mounting bracket 140 includes one or more upper arms 141 and one or more lower arms 142, both upper and lower arms 141 and 142 extending laterally from body 138 for mounting to cooler body 14 or basket 12. At its outboard end, upper arm 142 turns downwardly to form a hook 143 that is sized and shaped for a snug and preferably snap fit in any of the slots 47 (of cooler body 14) or 46 (of basket 12). At its outboard end, the one or more lower arm(s) 142 turns up slightly to form a nub 144 to lodge subjacent to either ledge 26 (of cooler body 14) or ledge 68 (of basket 12). Where ledge 26 and or ledge 68 includes a ridge 70 (FIG. 33) to define a recess there at, the nub 144 of arm 142 provides a detent type of engagement with such ledge 26 and or ledge 68. Due to its width and expected load, utensil carrier 137 includes at least two, if not three upper arms 141 that will be spaced apart appropriately to align with the two or three slots 47 or 46 of cooler body 14 or basket 12, respectively. Utensil carrier 137 can thus be mounted in a variety of different places on cooler body 14 or basket 12.

Referring to FIGS. 27-29, there is shown a rod holder 148 connected with a cooler 10 in accordance with the present invention. Like utensil carrier 137, rod holder 148 is removably connected to cooler body 14 of cooler 10. Rod holder 148 includes a pair of sleeves 149 and 150 and a mounting bracket 151. Each sleeve is a tube with bottom (not shown) or elements at the bottom of the sleeve that prevent large objects form falling through the sleeve. Each sleeve is intended to receive and hold a tubular element such as, and not limited to, a fishing pole, umbrella, cane or other stick-shaped item. In the event of a fishing pole that has a reel extending laterally from the lower rod portion, a bottom for the sleeve is unnecessary because the reel will prevent the fishing pole from going all the way through the sleeve. The mounting bracket 151 of rod holder 148 is the same as the mounting bracket 140 of utensil carrier 137 and of any other accessory for connection to cooler body 14 or basket 12, essentially having upper and lower mounting arms 152 and 153 that are sized and shaped for removable engagement with slots 47 (or 46) and ledge 26 (or 68). Upper arms 152 likewise have hooks 155 for engagement in slots 47 (or 46), and arm 153 has upstanding nub 156 for engagement with ledge 26 (or 68).

Figure 31:
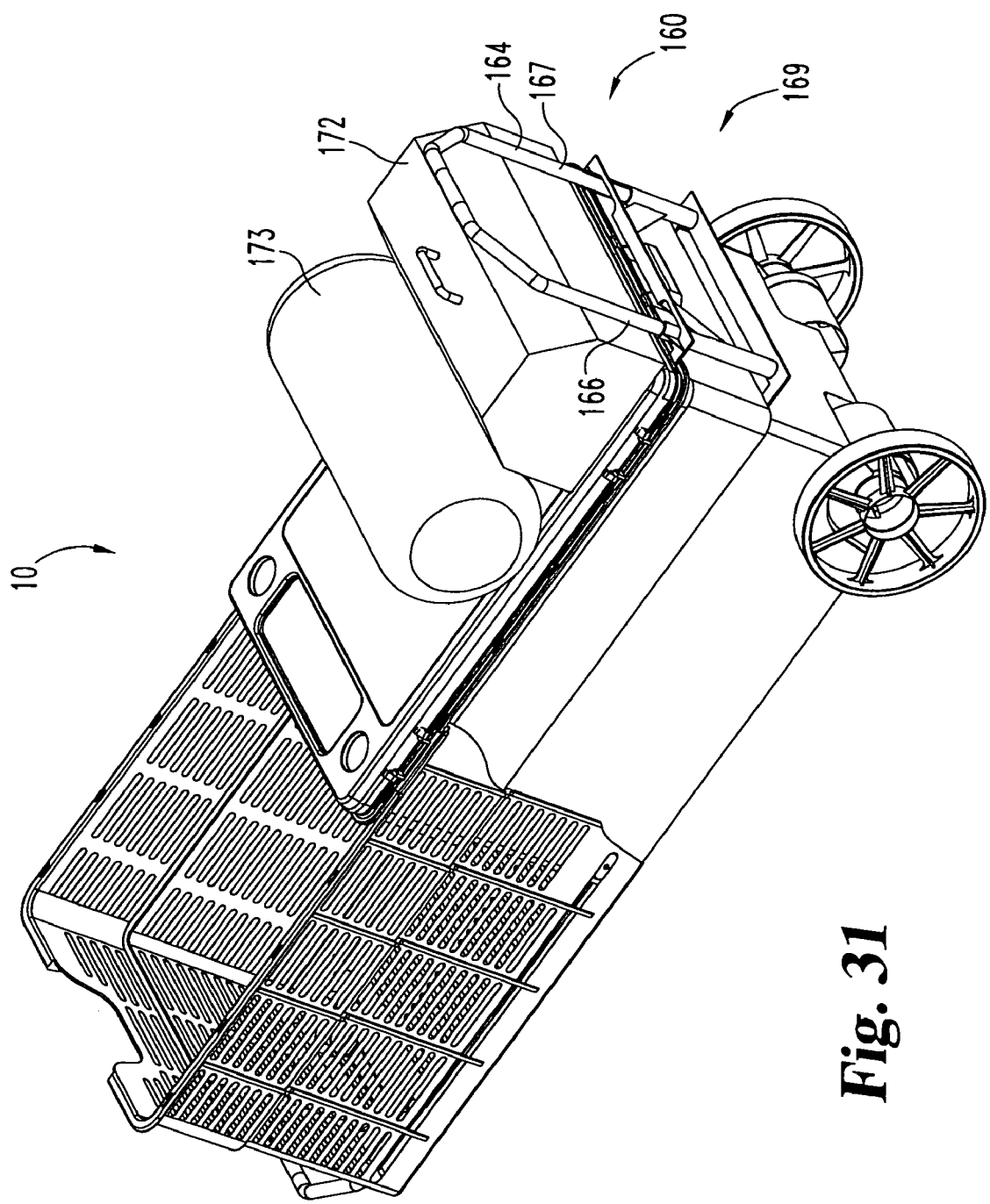
FIG. 31 is a perspective view of the multipurpose cooler 10 of FIG. 30 and shown with backrest 160 in the up, and extended position 169.

Referring to FIGS. 30-31, there is shown another accessory attachment—a backrest 160—for connection with a cooler 10 in accordance with the present invention. Backrest 160 includes a pair of frame sleeves 161 and 162, a mounting bracket 163 connecting mutually parallel frame sleeves 161 and 162 together, and a U-shaped slide 164. Like utensil carrier 137 and rod holder 148, mounting bracket 163 includes upper and lower arms sized and configured for mounting to slots 47 (or 46) and ledge 26 (or 68) of cooler body 14 or basket 12, as desired. Mounting bracket 163 holds frame sleeves 161 and 162 securely aligned and positioned to slidingly receive the opposing arms 166 and 167 of slide 164 which, when mounted to the rear end of cooler body 14 (as shown in FIG. 30), can slide between a down, retracted position 168 (FIG. 30) and an up, extended position 169 (FIG. 31). An appropriate detent or latch mechanism (not shown) is provide to appropriately hold slide 164 in the up, extended position 169. In the up, extended position 169, items such as a tool box 172 and sleeping bag 173, for example, can be loaded atop cooler body 14 where they are supported against sliding off the rear of cooler body 14 by backrest 160 when cooler body 14 is tilted for transport, as shown in FIG. 31. An alternative backrest 175 is shown in FIG. 32, backrest 175 likewise being attachable to cooler body 14. But unlike backrest 160 of FIGS. 30-31, backrest 175 is fixed and does not extend between up and down positions. Though not shown, alternative accessories designed for connection to cooler body 14 or basket 12 are contemplated for holding items either during transport or when cooler 10 is stationary. For example, and without limitation, a simple watertight accessory container (not shown) with a mounting bracket like that of utensil carrier 137 is contemplated. Such accessory container could hold and keep dry money, music devices, jewelry, etc.

It is noted that the cooler 10 with backrest 160 (FIG. 30) is fitted with rough terrain wheels 120 and 121. Alternative embodiments are contemplated wherein cooler 10 does not include wheels, but instead merely slides at its lower edge. The point or area of sliding may be provided with a material that exhibits a low coefficient of friction with other surfaces. Alternatively, it is contemplated that separate wheels or other structure may be provided separately from multipurpose cooler 10, such as a wheeled dolly.

Basket 12 is contemplated to include any suitable configuration for holding articles, and the term "basket" is not intended to in any way limit the composition or configuration of member 12, which could therefore, for example, have solid, non-porous walls and or bottom.

As used herein, cutting board 28 is contemplated include both a surface suitable for cutting as well as a just flat surface for other uses. In the latter case, board 28 would still serve as an alternative flat surface to be placed atop basket 12, which would provide an additional work surface and would provide a cover to protect the contents of basket 12.

Alternative embodiments are contemplated wherein the slots (43 and 44) and hook (e.g. 155) arrangement is comprised of any other appropriate structure for providing removable connection of an accessory holding device to cooler body 14. For example and without limitation, slots 43 and 44 can be replaced with a groove or flange that is engaged by a one or more hooks on each accessory that appropriately engages such groove or flange to removably connect the accessory holding device to the cooler body. In further example and without limitation, slots 43 and 44 can be replaced with a Velcro® configuration. Also, the slot, groove, flange or other such structure may be a part of the accessory holding device, and the complementary hook or other connecting structure may be applied to the cooler body. Further, alternative embodiments are contemplated wherein only one connection assembly is provided to removably connect an accessory holding device to the cooler body 14 (instead of the two arms, 152 and 153, for example).

While the invention has been illustrated and described in detail in the drawings and foregoing description, the same is to be considered as illustrated and not restrictive in character, it being understood that only the preferred embodiment and a few alternative embodiments have been shown and described and that all changes and modifications that come within the spirit of the invention are desired to be protected.

What is claimed is:

1. A multipurpose cooler for storing and transporting items, comprising:
   a cooler body having a lid; and,
   a basket connected with said cooler body for sliding between a fully extended position forming, with said cooler body, a basket cavity for storing and transporting items and a fully retracted position against an exterior of said cooler body.

2. The multipurpose cooler for storing and transporting items of claim 1 wherein the fully retracted position includes said basket being substantially entirely collapsed against said cooler body and the basket cavity being substantially entirely nonexistent.

3. The multipurpose cooler for storing and transporting items of claim 2 further including a detent assembly connected with said cooler body and said basket to provide at least one intermediate position between the fully retracted position and the fully extended position.

4. The multipurpose cooler for storing and transporting items of claim 2 wherein said cooler body includes at least first and second opposing side walls, a first front wall and a bottom and said basket includes third and fourth side walls, a second front wall and a bottom wall, and wherein the third and fourth side walls slide in planes parallel to the first and second side walls, and the fully retracted position includes the second front wall being adjacent the first front wall.

5. The multipurpose cooler for storing and transporting items of claim 1 further including track means for guiding said basket between the fully extended and fully retracted positions.

6. The multipurpose cooler for storing and transporting items of claim 5 wherein said track means includes at least one slot defined in one of said cooler body and said basket and includes at least one post sized and configured for sliding receipt within said at least one slot, said at least one post defined in the other of said cooler body and said basket.

7. The multipurpose cooler for storing and transporting items of claim 6 wherein there are two of said slots in opposing sides of said basket.

8. The multipurpose cooler for storing and transporting items of claim 7 wherein there are two of said posts extending outwardly from opposing sides of said cooler body.

9. The multipurpose cooler for storing and transporting items of claim 8 wherein said posts are oblong-shaped.

10. The multipurpose cooler for storing and transporting items of claim 5 wherein said track means includes said cooler body having a guide clip and said basket having a flange constrained to slide in a defined path by said guide clip.

11. The multipurpose cooler for storing and transporting items of claim 2 further including a cutting board sized and configured for support atop said basket in the fully extended position.

12. The multipurpose cooler for storing and transporting items of claim 11 wherein said basket includes support means for holding said cutting board in a relatively stable position atop said basket.

13. The multipurpose cooler for storing and transporting items of claim 2 further including a cutting board positionable atop said cooler body.

14. The multipurpose cooler for storing and transporting items of claim 13 wherein the lid defines at least one recess sized and configured for complimentary receipt of said cutting board.

15. The multipurpose cooler for storing and transporting items of claim 14 wherein the lid includes latching means for removably holding said cutting board in the at least one recess.

16. The multipurpose cooler for storing and transporting items of claim 1 further including at least one accessory holding device attachable to said cooler body and configured for receipt and holding of various items.

17. The multipurpose cooler for storing and transporting items of claim 16 wherein one of said cooler body and said accessory holding devices defines at least one aperture and the other of said cooler body and said accessory holding device defines a member sized and configured for receipt in said at least one aperture to removable connect said accessory holding device to said cooler body.

18. The multipurpose cooler for storing and transporting items of claim 17 wherein said cooler body has a periphery and defines a plurality of apertures at the periphery, and wherein said accessory holding device includes an upper arm with a hook, the hook being the member sized and configured for receipt in one of the plurality of apertures.

19. The multipurpose cooler for storing and transporting items of claim 18 wherein said cooler body defines a ledge, and said accessory holding device has a lower arm configured for engagement with the ledge to contribute to the removable connection of said accessory holding device with said cooler body.

20. The multipurpose cooler for storing and transporting items of claim 17 wherein said basket has a periphery and defines a plurality of apertures at the periphery, and wherein said accessory holding device includes an upper arm with a hook, the hook being the member sized and configured for receipt in one of the plurality of apertures.

21. The multipurpose cooler for storing and transporting items of claim 20 wherein said basket defines a ledge, and said accessory holding device has a lower arm configured for engagement with the ledge to contribute to the removable connection of said accessory holding device with said basket.

22. The multipurpose cooler for storing and transporting items of claim 16 further including connecting connection means connected with said at least one accessory holding device and with at least one of said cooler body and said basket for removably connecting said at least one accessory holding device alongside of said at least one of aid cooler body and said basket.

23. The multipurpose cooler for storing and transporting items of claim 16 wherein said at least one accessory holding device includes a silverware container.

24. The multipurpose cooler for storing and transporting items of claim 16 wherein said accessory holding device includes a rod holder including at least one tubular member with a top end, the tubular member being open at its top end.

25. The multipurpose cooler for storing and transporting items of claim 2 further including standard wheels having a first diameter and being rotatably connected to said cooler body.

26. The multipurpose cooler for storing and transporting items of claim 25 further including all-terrain wheels configured for removably fixed connection to said standard wheels, the all-terrain wheels having a second diameter greater than the first diameter.

27. The multipurpose cooler for storing and transporting items of claim 26 wherein the second diameter is at least twice the first diameter.

28. The multipurpose cooler for storing and transporting items of claim 25 wherein each standard wheel defines keyholes and each all-terrain wheel has keyhooks sized and configured for removable locking engagement with the keyholes o coaxially connect one of said all-terrain wheels with one of said standard wheels.

29. The multipurpose cooler for storing and transporting items of claim 2 further including a handle slidably connected with said basket for extension between a full-in, storage position and a full-out, transport position.

30. The multipurpose cooler for storing and transporting items of claim 29 further including a detent assembly connected with said basket and said handle to provide at least one intermediate position between the full-in, storage position and the full-out, transport position.

31. The multipurpose cooler for storing and transporting items of claim 30 further including standard wheels rotatably connected to said cooler body.

32. The multipurpose cooler for storing and transporting items of claim 31 further including all-terrain wheels configured for removably fixed connection to said standard wheels.

33. A multipurpose cooler for storing and transporting items, comprising:
a cooler body;
a container body connected with said cooler body to slide between a fully extended position forming, with said cooler body, a cavity for receiving items and a fully retracted position on an exterior of said cooler body;
at least one accessory holding device for holding items; and,
connection means for removably connecting said at least one accessory holding device to one of said cooler body and said container body.

34. The multipurpose cooler for storing and transporting items of claim 33 further including wheels rotatably connected with said cooler body.

35. The multipurpose cooler for storing and transporting items of claim 34 further including a handle connected with said container body to slide between a full-in, storage position and a full-out, transport position.

36. A multipurpose cooler for storing and transporting items, comprising:
a cooler body having an insulated interior and an exterior;
a lid connected to said cooler body to permit selective access to the interior;
a container body having three walls and a bottom and being slidably connected to an exterior of said cooler body to slide between a fully extended position defining, with said cooler body, a cavity for storing and transporting items and a fully retracted position wherein said cavity is substantially nonexistent.

* * * * *